United States Patent
Viger et al.

(10) Patent No.: US 9,749,091 B2
(45) Date of Patent: Aug. 29, 2017

(54) METHOD AND DEVICE FOR DATA COMMUNICATION IN A COMMUNICATION NETWORK

(71) Applicant: CANON KABUSHIKI KAISHA, Tokyo (JP)

(72) Inventors: Pascal Viger, Janze (FR); Romain Guignard, Rennes (FR); Stéphane Baron, Le Rheu (FR)

(73) Assignee: Canon Kabushiki Kaisha, Tokyo (JP)

(*) Notice: Subject to any disclaimer, the term of this patent is extended or adjusted under 35 U.S.C. 154(b) by 468 days.

(21) Appl. No.: 14/550,780

(22) Filed: Nov. 21, 2014

(65) Prior Publication Data

US 2015/0146648 A1   May 28, 2015

(30) Foreign Application Priority Data

Nov. 25, 2013 (GB) .................................. 1320713.9

(51) Int. Cl.
*H04L 1/16* (2006.01)
*H04W 84/12* (2009.01)

(52) U.S. Cl.
CPC .......... *H04L 1/1685* (2013.01); *H04L 1/1621* (2013.01); *H04L 1/1614* (2013.01); *H04W 84/12* (2013.01)

(58) Field of Classification Search
CPC .............................. H04L 1/1685; H04L 1/1621
See application file for complete search history.

(56) References Cited

U.S. PATENT DOCUMENTS

| | | | |
|---|---|---|---|
| 2008/0212612 A1* | 9/2008 | Singh ............... | H04L 1/1614 370/474 |
| 2013/0301625 A1* | 11/2013 | Thoukydides ....... | H04W 28/06 370/338 |

FOREIGN PATENT DOCUMENTS

| | | |
|---|---|---|
| EP | 1571773 A2 | 9/2005 |
| WO | 2012/030541 A1 | 3/2012 |

* cited by examiner

*Primary Examiner* — Siming Liu
(74) *Attorney, Agent, or Firm* — Canon USA, Inc. I.P. Division

(57) ABSTRACT

The present invention relates generally to communication networks and more specifically to methods and devices for data communication over a communication network. A method according to the invention comprises, at a transmitting node: obtaining a plurality of frames including first-type frames associated with an acknowledgment policy requiring acknowledgment and second-type frames associated with an acknowledgment policy requiring no acknowledgment; aggregating the frames of the obtained plurality of frames into an aggregated frame including at least one leading frame of second type and frames subsequent thereto, in an order depending on their associated acknowledgment policies; sending the aggregated frame to a receiving node; and sending an acknowledgment request frame to the receiving node to request it to acknowledge receipt of only subsequent frames of the aggregated frame. Such data communication scheme is liable to reduce bandwidth waste and head-of-line blocking and thus latency, compared to known scheme.

18 Claims, 9 Drawing Sheets

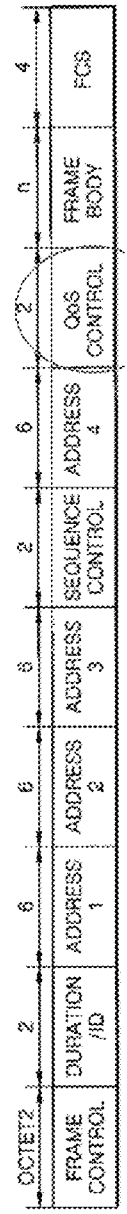
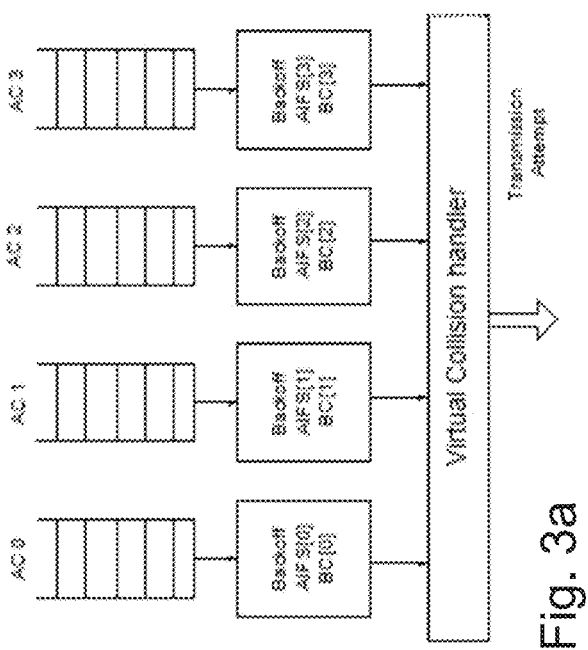
Fig. 3a
Fig. 3b
Fig. 3c

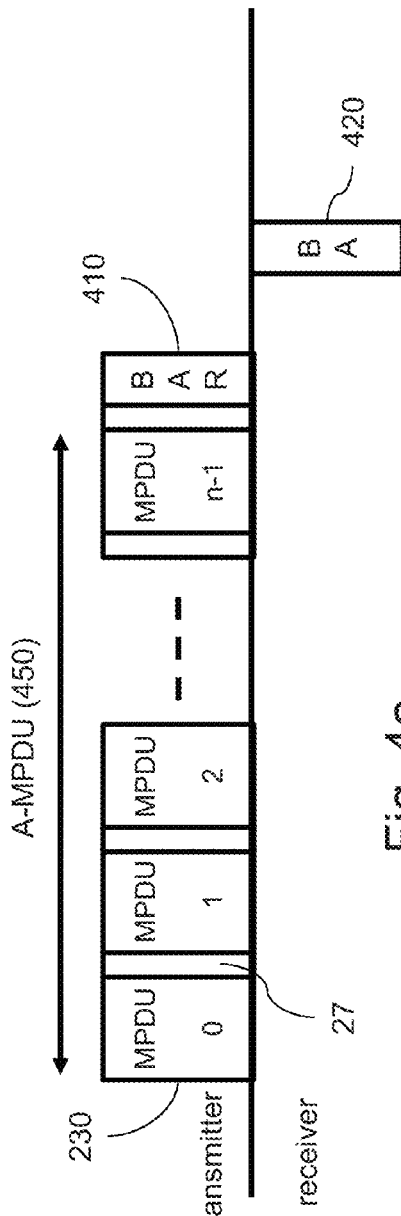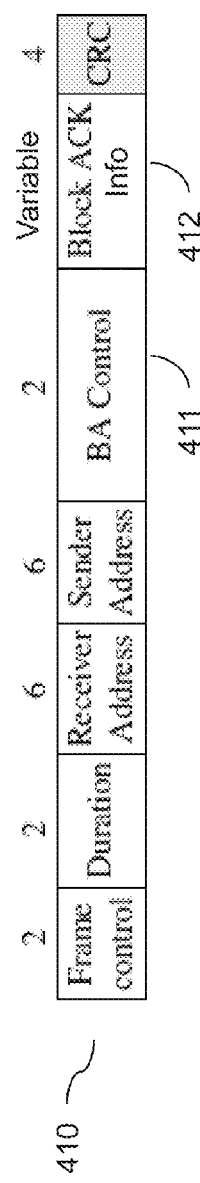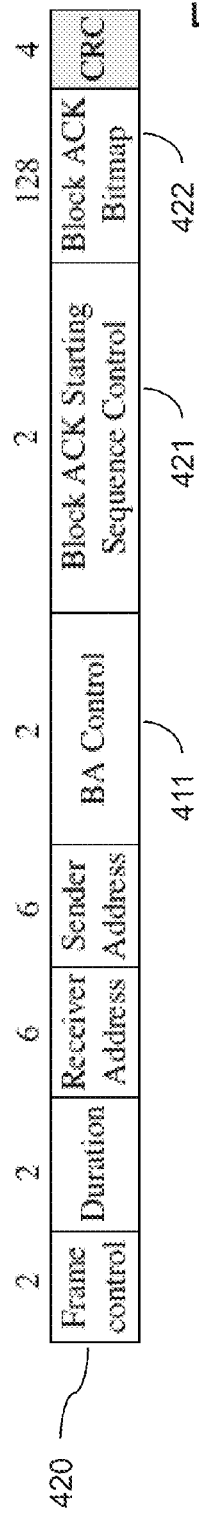

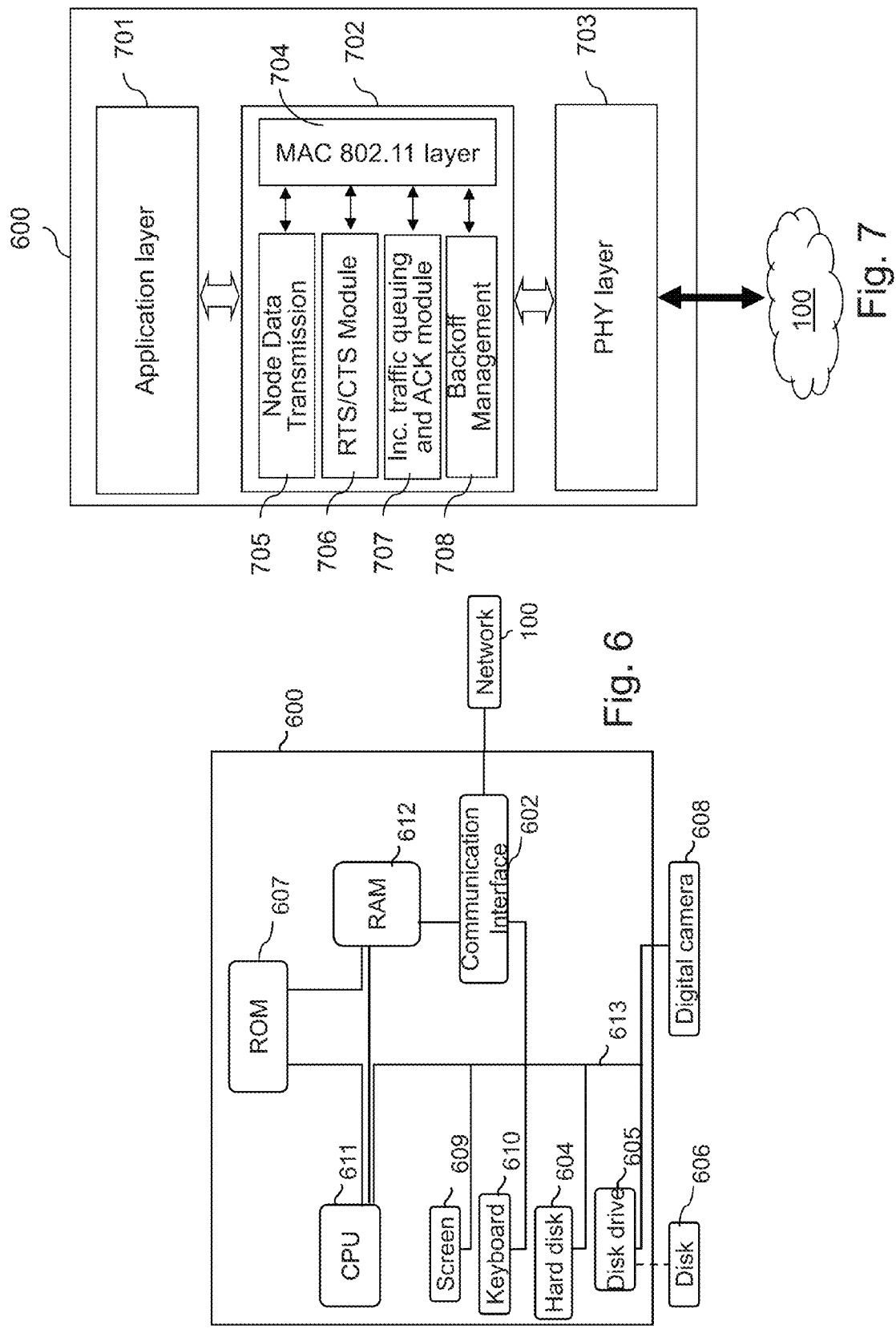

METHOD AND DEVICE FOR DATA COMMUNICATION IN A COMMUNICATION NETWORK

This application claims the benefit under 35 U.S.C. §119 (a)-(d) of United Kingdom Patent Application No. 1320713.9, filed on Nov. 25, 2013 and entitled "Method and device for data communication in a communication network". The above cited patent application is incorporated herein by reference in its entirety

FIELD OF THE INVENTION

The present invention relates generally to communication networks and more specifically to methods and devices for data communication over a communication network.

BACKGROUND OF THE INVENTION

In communication protocols, receiving nodes acknowledge receipt of data frames transmitted by transmitting nodes. This is generally done by sending an acknowledgment (ACK) frame after each received data frame.

This is for example the case with wireless networks implementing the IEEE 802.11 standard which relies on a CSMA/CA (standing for Carrier Sense Multiple Access with Collision Avoidance) contention-based mechanism.

In IEEE 802.11e standard providing quality of service enhancements to make more efficient use of the wireless channel, an optional feature, called Block ACK or block acknowledgment, has been proposed to allow several data frames to be transmitted by a transmitting node before an ACK frame is returned by the receiving node. In some implementations, the transmitting node sends a Block ACK request frame to the receiving node once the several data frames have been transmitted. In such situation, only one signalling ACK frame is thus needed to acknowledge a block of frames.

This optional feature increases communication efficiency since every ACK frame has a significant overhead for radio synchronization.

An improvement of the above standard, known as IEEE 802.11n standard, proposes two frame aggregation schemes that make it possible to transmit several data frames of a same traffic stream (such as voice, video and best effort data, associated with specific traffic specification) in a burst using an aggregated frame.

The two aggregation schemes, Mac Service Data Units (MSDU) aggregation (namely A-MSDU) and Message Protocol Data Unit (MPDU) aggregation (namely A-MPDU), aggregate multiple MAC service data units (MSDUs or MAC data frame) following the order by which the MSDUs are input in a transmission queue or buffer. Both aggregation methods reduce the overhead to only a single radio preamble for each frame transmission.

With such aggregation schemes, Block ACK has become mandatory, and the Block ACK frame returned by the receiving node thus includes an acknowledgement bitmap that covers a larger number of data frames.

In practice, the transmission queue or buffer from which MSDUs are output to form an aggregated frame is liable to store data frames having different acknowledgment policies in a same process of acknowledgment, for example first-type frames associated with an acknowledgment policy requiring acknowledgment and second-type frames associated with an acknowledgment policy requiring no acknowledgment. In other words, the aggregated frame mixes first-type frames and second-type frames depending on the order in which they are input in the transmission queue or buffer (TX FIFO).

To appropriately designate the frames to be acknowledged to the receiving node, the above IEEE 802.11n standard provides that the Block ACK request frame includes a "block ACK starting sequence control" value that usually indicates the sequence number of the first (i.e. the oldest one regarding the time sequence of input in the transmission buffer TX FIFO) frame in the aggregated frame. Note that the sequence number is a number incremented by one (1) at each new frame transmitted.

According to IEEE 802.11 standard, all the frames starting from the "block ACK starting sequence control" and covered by the acknowledgment bitmap have to be acknowledged, regardless they are of the first or second type (i.e. no matter they require acknowledgment or not). The receiving node thus fills the acknowledgement bitmap for each of these data frames.

As just described, the above-described Block ACK mechanism is session oriented. This results in that independent acknowledgment policies cannot be applied to each individual data frame of the aggregated frame as explained previously.

This mechanism which may concerns a wide variety of communication wireless networks leads to several drawbacks.

First, this mechanism leads to retransmitting non-received or erroneously received second-type frames that are covered by the Block ACK request frame (i.e. acknowledgment thereof is requested), whereas they should not require acknowledgment. This results in waste of network bandwidth.

Second, at the receiving node, this mechanism has an impact on the frames that follows the first non-received or erroneously received frame. In particular, it suspends transmission of such frames to an upper layer, usually from the Medium Access Control (MAC) OSI-sub-layer to the Logical Link Control (LLC) OSI-sub-layer.

This is particularly detrimental to latency, for example for audio/video applications, in case the first non-received or erroneously received frame is a second-type frame requiring no acknowledgment within the transmitting node but for which an acknowledgment is required given the session-oriented Block ACK request frame. This limitation prevents correctly received audio/video data to be delivered immediately to the upper stack layer. This limitation is known as the head-of-line blocking phenomenon.

The present invention has been devised to address at least one of the foregoing concerns.

SUMMARY OF THE INVENTION

According to a first aspect of the invention, there is provided a method for data communication in a communication network, the method comprising, at a transmitting node:

obtaining a plurality of frames including at least one first-type frame associated with an acknowledgment policy requiring acknowledgment and at least one second-type frame associated with an acknowledgment policy requiring no acknowledgment;

aggregating the frames of the obtained plurality of frames into an aggregated frame including at least one leading frame of second type and frames subsequent thereto, in an order depending on their associated acknowledgment policies;

sending the aggregated frame to a receiving node;

sending an acknowledgment request frame to the receiving node to request it to acknowledge receipt of only subsequent frames of the aggregated frame.

Conversely, there is provided a communication device in a communication network, comprising:

an obtaining module configured to obtain a plurality of frames including at least one first-type frame associated with an acknowledgment policy requiring acknowledgment and at least one second-type frame associated with an acknowledgment policy requiring no acknowledgment;

a frame aggregator configured to aggregate the frames of the obtained plurality of frames into an aggregated frame including at least one leading frame of second type and frames subsequent thereto, in an order depending on their associated acknowledgment policies;

a network transmission module configured to send the aggregated frame to a receiving node and to send an acknowledgment request frame to the receiving node to request it to acknowledge receipt of only subsequent frames of the aggregated frame.

The data communication scheme defined above is liable to reduce bandwidth waste and to reduce the head-of-line blocking phenomenon and thus latency.

This is achieved by reordering the frames in the aggregated frame and by designing the acknowledgment request frame to request acknowledgment for a subset of frames, in particular by avoiding at least that the first frame (which is of the second type) in the aggregated frame be acknowledged.

The reordering of the invention which contrasts with the conventional order of the frames as received in the transmission queue or buffer TX FIFO from where they are obtained, makes it possible to have a higher number of second-type frames before the first first-type frame in the aggregated frame from which the acknowledgment may be requested.

As a consequence, for a given frame that is received, a higher number of correctly received first-type frames can be transmitted at the receiving node to an upper layer of the protocol stack in said receiving node, independently of errors in received second-type frames that are now no longer subject to acknowledgment.

Particular to the invention and contrary to IEEE 802.11 standard, the acknowledgment request frame now indicates another frame than the very first (or leading) frame of the aggregate frame, as the frame from which acknowledgment is requested to the receiving node. This ensures the frame or frames at the beginning of the aggregated frame (which preferably do not require acknowledgment) not to cause head-of-line blocking in case it or they are not correctly received.

Further embodiments of the invention are defined in the dependent appended claims and are explained below in terms of method features.

In one embodiment, the second-type frames are all inserted at the beginning of the aggregated frame, before the first-type frames, and the acknowledgment request frame requests the receiving node to acknowledge receipt of only the first-type frames of the aggregated frame. This is to ensure none of the second-type frames (without acknowledgment) to be blocked for transmission at an upper layer in the receiving node, due to failure when receiving one of the first-type frames (with acknowledgment).

In this configuration all the frames, be first type or second type, will be acknowledged by the receiving node according to their associated acknowledgment policy as defined in the transmitting node. This configuration of the invention thus overcomes the constraint of the session-oriented Block ACK request frame of known prior art according to which all the frames, including the second-type frame, are necessarily acknowledged.

Of course, if this configuration is not achieved, some second-type frames may belong to the subsequent frames in which case they may be subject to acknowledgment by the receiving node, depending on how the acknowledgment request is made.

For example, all the subsequent frames can require acknowledgment by the receiving node. This is the case when using conventional sequence number SSN in a "Block ACK starting sequence control" value (BA-SSC) of the Block Acknowledgment Request (BAR) frame of the IEEE 802.11e standard, because all the frames, including the second-type frames, that follow SSN have to be acknowledged.

Embodiments may allow these second-type subsequent frames not to require acknowledgment by the receiving node. For example, a bitmap indicating the acknowledgment policy of each of the subsequent frames can be provided in the BAR frame. In a variant, the subsequent frames can be acknowledged based on the nature of their content (e.g. video data, audio data, control data), which information may be obtained from an upper OSI layer (e.g. application layer). The BAR frame may thus specify the nature of the content of the frames that have to be acknowledged.

According to a specific embodiment, aggregating the frames comprises:

successively retrieving frames from an output of a transmission buffer (TX FIFO) so long as a sum of the sizes of the retrieved frames does not exceed a predefined threshold, to enqueue (i.e. to insert) each retrieved frame in the aggregating frame if the retrieved frame is associated with an acknowledgment policy requiring no acknowledgment (i.e. of the second type) or to store the retrieved frame in a separate ordered memory if the retrieved frame is associated with an acknowledgment policy requiring acknowledgment (i.e. of the first type); and enqueuing the frames stored in the separate ordered memory in the aggregating frame keeping their order, once the sum reaches the predefined threshold.

In practice, the threshold is preferably defined in function of the amount of data that can be sent during a granted transmission opportunity, given a transmission physical rate.

In this specific embodiment, the separate memory is ordered so as to keep frame order in which they (the frames) are retrieved. For example the separate memory may be a FIFO (first-in first-out) memory.

This specific embodiment is very simple to be implemented to ensure an appropriate insertion of all the second-type frames before the first-type frames in the aggregated frame.

According to a further specific embodiment, each frame in the transmission buffer is associated with a flag defining its associated acknowledgment policy, the flag being stored in the transmission buffer. This embodiment is a simple way for a lower OSI layer performing the aggregation (e.g. MAC layer) to be aware of the frame acknowledgment policies in case they are determined by an upper layer (e.g. LLC layer) within the transmitting node.

The use of a flag, which may be limited to a single bit in case only two acknowledgment policies compete, in the buffer reveals to be of low cost while efficiently conveying the information from the upper layer to the lower layer.

In another further embodiment, the acknowledgment request frame includes a sequence number defining the first subsequent frame to acknowledge in the aggregate frame, said sequence number identifying the first frame of the first type inserted in the aggregated frame. This sequence number makes it possible for the receiving node to be informed of the frames to be acknowledged (the frames following the sequence number). Note that the sequence number is incremented as the frames are inserted in the aggregated frame.

This provision ensures the second-type frames positioned prior to the sequence number in the aggregate frame not to be acknowledged, thus avoiding head-of-line blocking due to these previous second-type frames.

In the situation where the including of the sequence number is combined with the insertion of all the second-type frames before the first-type frames in the aggregated frame, it results that every frame of the aggregated frame is acknowledged according to its associated acknowledgment policy.

Furthermore, these embodiments are fully compliant with the above mentioned IEEE 802.11 standards.

According to a particular embodiment, the method further comprises, at the transmitting node:

storing each frame of the plurality of frames in a retransmission buffer until receiving an acknowledgment of such frame from the receiving node; and upon sending the acknowledgment request frame, flushing stored frames from the retransmission buffer up to the frame identified by the sequence number.

This provision optimizes use of memory at the transmitting node.

In one embodiment, the method further comprises, at the transmitting node, determining the acknowledgment policy of each frame of the plurality of frames based on protocol information of a protocol of higher OSI layer than the protocol embedding the frame aggregation scheme. In a variant, a user may also define, using a user graphic interface, the acknowledgment policy of the frames based for example on traffic type (for instance control data vs. video data).

Thanks to this provision, the head-of-line blocking phenomenon is reduced to specific data due to transmission protocol or user definition. This contrasts with the conventional classification according to IEEE 802.11 where the acknowledgment policies are based only on access categories AC/TID.

In one embodiment, the frames of the obtained plurality of frames are Medium Access Control (MAC) Service Data Units (MSDUs) and the aggregated frame is an aggregate-MAC Protocol Data Unit (A-MPDU) according to the IEEE 802.11n standard. Optionally, this embodiment can also implement the aggregation of MSDUs into one or more aggregate-MAC Service Data Units (A-MSDUs) according to the IEEE 802.11n standard, which in turns are aggregated into the A-MPDU.

With these standardized frames, the acknowledgment mechanism preferably uses the block acknowledgment mechanism as defined in IEEE 802.11n standard.

The IEEE 802.11n standard is a preferred application of the present invention to fully take advantage of the standardized aggregation mechanism.

In the context of such standard, the aggregation may be conducted on a given traffic identifier (TID) within a given access category (AC).

In another embodiment, the communication network has a wireless medium shared between a plurality of communication nodes, and the aggregated frame and the acknowledgment request frame are sent upon contention-based accessing the shared wireless medium for a transmission opportunity. This is an implementation of the invention in wireless local area networks such as those based on IEEE 802.11 standard.

In yet another embodiment, the plurality of frames is obtained from a transmission buffer selected from a plurality (e.g. four) of transmission buffers corresponding to a plurality (e.g. four) of access categories having different network access parameters and different transmission priority values. A particular application of the invention is the management of the competing four access-categories transmission queues within communication nodes complying with IEEE 802.11e standard.

In particular, the transmission buffers compete for accessing a wireless medium of the communication network using a contention-based mechanism.

According to a specific feature, each of the transmission buffers implements a backoff procedure for it to be granted a transmission opportunity on the communication network, and preference for grant of a transmission opportunity is given to the transmission buffer associated with the highest transmission priority value when the backoff procedures of two or more transmission buffers end simultaneously. This ensures quality of service (QoS) as defined in IEEE 802.11e standard to be fulfilled.

Another aspect of the invention relates to a non-transitory computer-readable medium storing a program which, when executed by a microprocessor or computer system in a communication device of a communication network, causes the communication device to perform the steps of:

obtaining a plurality of frames including at least one first-type frame associated with an acknowledgment policy requiring acknowledgment and at least one second-type frame associated with an acknowledgment policy requiring no acknowledgment;

aggregating the frames of the obtained plurality of frames into an aggregated frame including at least one leading frame of second type and frames subsequent thereto, in an order depending on their associated acknowledgment policies;

sending the aggregated frame to a receiving node;

sending an acknowledgment request frame to the receiving node to request it to acknowledge receipt of only subsequent frames of the aggregated frame.

The non-transitory computer-readable medium may have features and advantages that are analogous to those set out above and below in relation to the method and device, in particular that of reducing bandwidth waste, reducing head-of-line blocking and thus reducing latency.

Another aspect of the invention relates to a method for data communication in a communication network substantially as herein described with reference to, and as shown in, FIG. 8; FIGS. 8 and 9; FIGS. 8, 9 and 10 of the accompanying drawings.

Yet another aspect of the invention relates to a communication device in a communication network substantially as herein described with reference to, and as shown in, FIG. 7 of the accompanying drawings.

At least parts of the method according to the invention may be computer implemented. Accordingly, the present invention may take the form of an entirely hardware embodiment, an entirely software embodiment (including firmware, resident software, micro-code, etc.) or an embodiment combining software and hardware aspects which may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium, for example a tangible carrier medium or a transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIGS. 3a, 3b and 3c illustrate the IEEE 802.11e EDCA involving access categories;

FIGS. 4a, 4b and 4c illustrate the 802.11e/n Block Ack feature applied to an aggregate MPDU;

FIG. 6 is a block diagram illustrating components of a communication device in which embodiments of the invention may be implemented;

FIG. 7 illustrates function blocks of the same communication device;

DETAILED DESCRIPTION OF EMBODIMENTS OF THE INVENTION

A goal of the invention is to provide a frame-based acknowledgment strategy in case frames are acknowledged by block. In particular, the invention seeks to provide a distinct acknowledgment policy for data packets or frames that are sent in a burst from the same transmission buffer or queue (TX FIFO).

This is because in known systems, in particular in IEEE 802.11 networks, acknowledgment of all the frames in the burst is usually requested no matter some of these frames do not require acknowledgment. In other words, acknowledgment policies inextricably and individually associated with each frame appear to be lost for some of the frames.

By making it possible to shift acknowledgment requirement to only a subpart of the considered frames of the burst, preferably to only the frames requiring acknowledgment according to their own acknowledgment policies, the present invention reduces bandwidth waste, reduces head-of-line blocking phenomenon, and thus reduces latency.

Embodiments of the present invention are specifically directed to IEEE 802.11 networks, and keep compliance with the standards.

The description below mainly focuses on IEEE 802.11 networks although the invention applies to any other communication network, be wired or wireless, provided that they use acknowledgment by blocks (Block ACK type) in their transmission scheme.

Wireless local area networks (WLANs), such as a wireless medium in a communication network using Carrier Sense Multiple Access with Collision Avoidance (CSMA/CA), are founded on the principles of collision avoidance. Such networks may also conform to a communication standard such as a communication protocol of 802.11 type e.g. Medium Access Control (MAC).

The IEEE 802.11 MAC standard defines the way WLANs must work at the physical and medium access control (MAC) level. Typically, the 802.11 MAC (Medium Access Control) implements the well-known Distributed Coordination Function (DCF) which relies on a contention-based mechanism based on the so-called "Carrier Sense Multiple Access with Collision Avoidance" (CSMA/CA) technique.

The 802.11 medium access protocol standard is mainly directed to the management of communication nodes waiting for the medium to become idle so as to try to access to the medium.

Figure 1:
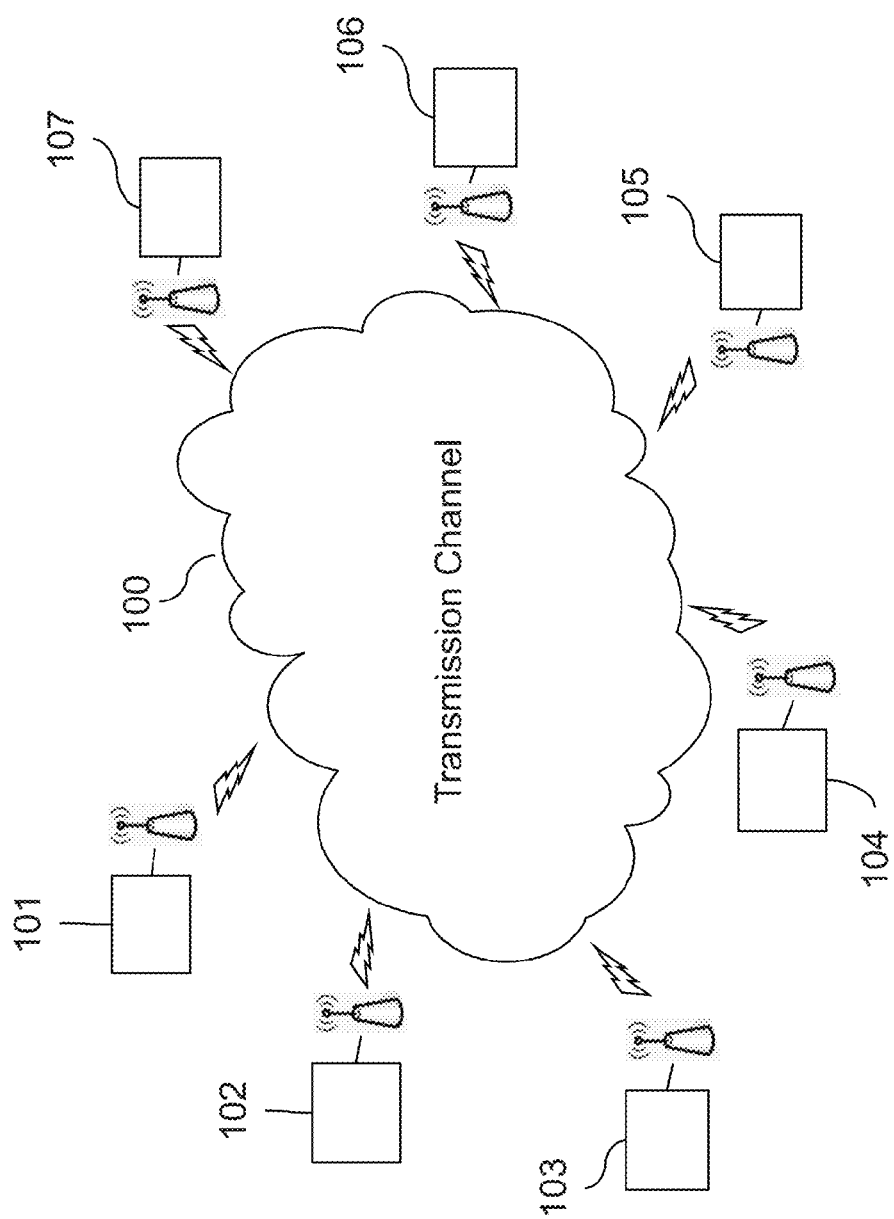
FIG. 1 illustrates a typical wireless communication system in which embodiments of the invention may be implemented.

FIG. 1 illustrates a communication system in which several communication nodes exchange data frames over a radio transmission channel 100 of a wireless local area network (WLAN).

Access to the shared radio medium to send data frames is based on the CSMA/CA technique, for sensing the carrier and avoiding collision by separating concurrent transmissions in space and time.

Carrier sensing in CSMA/CA is performed by both physical and virtual mechanisms. Virtual carrier sensing is achieved by transmitting control frames to reserve the medium prior to transmission of data frames.

Then after, a transmitting node first attempts through the physical mechanism, to sense a medium that has been idle for at least one DIFS (standing for DCF InterFrame Spacing) time period, before transmitting data frames.

However, if it is sensed that the shared radio medium is busy during the DIFS period, the transmitting node still waits until the radio medium becomes idle. To do so, it starts a countdown backoff counter designed to expire after a number of timeslots, chosen randomly between [0,CW], CW (integer) being referred to as the Contention Window. This backoff mechanism or procedure is the basis of the collision avoidance mechanism that defers the transmission time for a random interval, thus reducing the probability of collisions on the shared channel. After the backoff time period, the transmitting node may send data or control frames if the medium is idle.

One problem of wireless data communications is that it is not possible for the transmitting node to listen while sending, thus preventing the transmitting node from detecting data corruption due to channel fading or interference or collision phenomena. A transmitting node remains unaware of the corruption of the data frames sent and continues to transmit the frames unnecessarily, thus wasting access time.

The Collision Avoidance mechanism of CSMA/CA thus provides positive acknowledgement (ACK) of the sent data frames by the receiving node in case of successful frame reception, to notify the transmitting node that no corruption of the sent data frames occurred.

The ACK is transmitted at the end of reception of the data frame, immediately after a period of time called Short InterFrame Space (SIFS).

If the transmitting node does not receive the ACK within a specified ACK timeout or detects the transmission of a different frame on the channel, it may infer data frame loss. In that case, it generally reschedules the frame transmission according to the above-mentioned backoff procedure. However, this can be seen as a bandwidth waste in case only the ACK has been corrupted but the data frames were correctly received by the receiving node.

To improve the Collision Avoidance efficiency of CSMA/CA, a four-way handshaking mechanism is optionally implemented. One implementation is known as the RTS/CTS exchange, defined in the 802.11 standard.

The RTS/CTS exchange consists in exchanging control frames to reserve the radio medium prior to transmitting data frames during a transmission opportunity called TXOP in the 802.11 standard as described below, thus protecting data transmissions from any further collisions.

Figure 2:
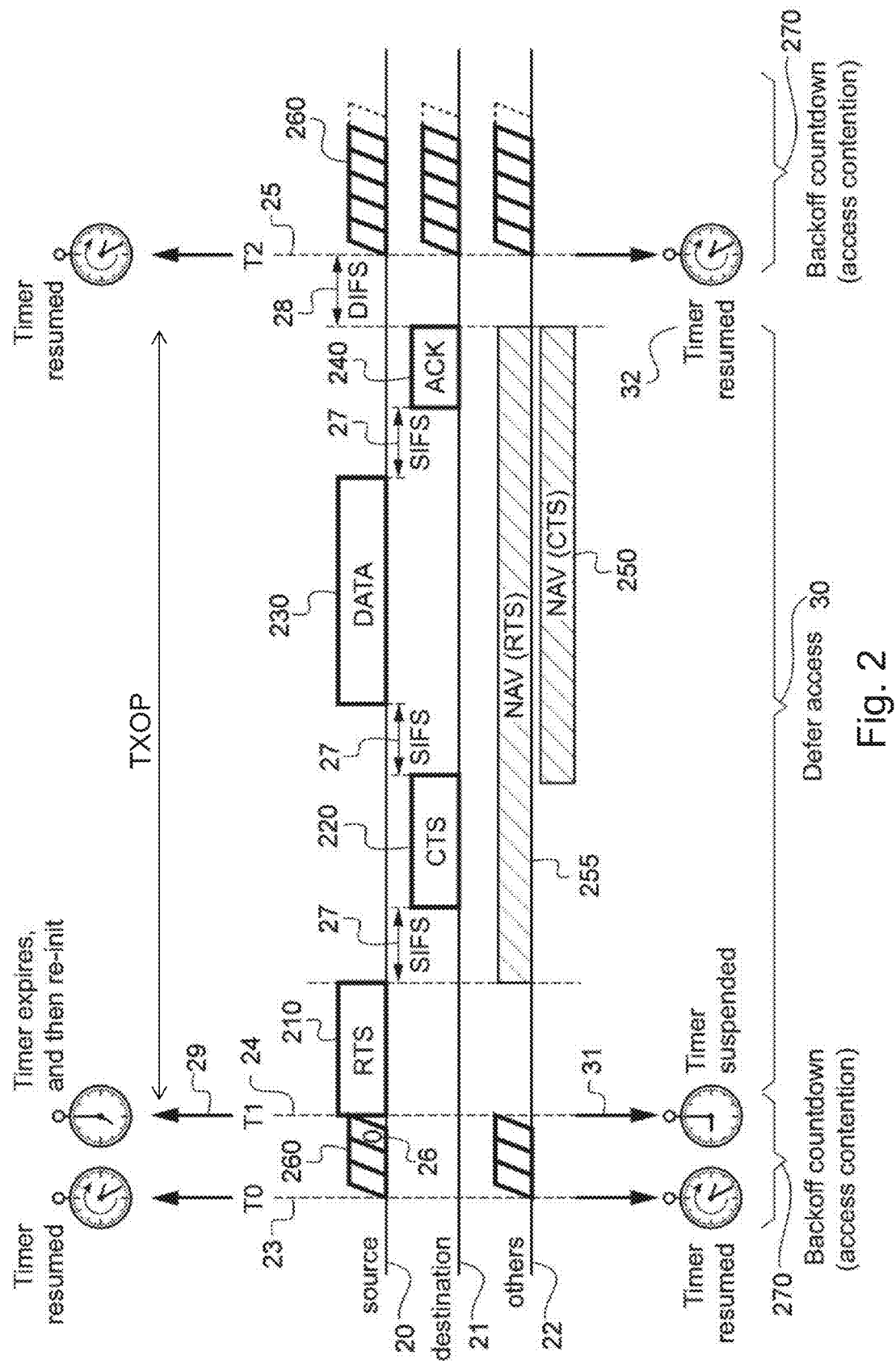
FIG. 2 is a timeline schematically illustrating the conventional communication mechanism according to 802.11 standard.

FIG. 2 illustrates the behaviour of three groups of nodes during a conventional communication over the 802.11 medium: transmitting or source node 20, receiving or addressee or destination node 21 and other nodes 22 not involved in the current communication.

Upon starting the backoff process 270 prior to transmitting data, a station e.g. transmitting node 20, initializes its backoff time counter to a random value as explained above. The backoff time counter is decremented once every time slot interval 260 for as long as the radio medium is sensed idle (count down starts from T0, 23 as shown in the Figure).

The time unit in the 802.11 standard is the slot time called 'aSlotTime' parameter. This parameter is specified by the PHY (physical) layer (for example, aSlotTime is equal to 9 µs for the 802.11n standard). All dedicated space durations (e.g. backoff) are multiples of this time unit.

The backoff time counter is 'frozen' or suspended when a transmission is detected on the radio medium channel (countdown is stopped at T1, 24 for other nodes 22 having their backoff time counter decremented).

The countdown of the backoff time counter is resumed or reactivated when the radio medium is sensed idle anew, after a DIFS time period. This is the case for the other nodes at T2, 25 as soon as the transmission opportunity TXOP granted to transmitting node 20 ends and the DIFS period 28 elapses. DIFS 28 (DCF inter-frame space) thus defines the minimum waiting time for a transmitting node before trying to transmit some data. In practice, DIFS=SIFS+2*aSlotTime.

When the backoff time counter reaches zero (26) at T1, the timer expires, the corresponding node 20 will request access onto the medium in order to be granted a TXOP, and the backoff time counter is reinitialized 29 using a new random backoff value.

In the example of the Figure implementing the RTS/CTS scheme, at T1, the transmitting node 20 that wants to transmit data frames 230 sends a special short frame or message acting as a medium access request to reserve the radio medium, instead of the data frames themselves, just after the channel has been sensed idle for a DIFS or after the backoff period as explained above.

The medium access request is known as a Request-To-Send (RTS) message or frame. The RTS frame generally includes the address of the receiving node ("destination 21") and the duration for which the radio medium is to be reserved for transmitting the control frames (RTS/CTS) and the data frames 330.

Upon receiving the RTS frame and if the radio medium is sensed as being idle, the receiving node 21 responds, after a SIFS time period 27 (for example, SIFS is equal to 16 µs for the 802.11n standard), with a medium access response, known as a Clear-To-Send (CTS) frame. The CTS frame indicates the remaining time required for transmitting the data frames, computed from the time point at which the CTS frame starts to be sent.

The CTS frame is considered by the transmitting node 20 as an acknowledgment of its request to reserve the shared radio medium for a given time duration.

Thus, the transmitting node 20 expects to receive a CTS frame 220 from the destination node 21 before sending data 230 using unique and unicast (one source address and one addressee or destination address) frames.

The transmitting node 20 is thus allowed to send the data frames 230 upon correctly receiving the CTS frame 220 and after a new SIFS time period 27.

An ACK frame 240 is sent by the receiving node 21 after having correctly received the data frames sent, after a new SIFS time period 27.

If the transmitting node 20 does not receive the ACK 240 within a specified ACK Timeout (generally within the TXOP), or if it detects the transmission of a different frame on the radio medium, it reschedules the frame transmission according to the backoff procedure.

Since the RTS/CTS four-way handshaking mechanism 210/220 is optional in the 802.11 standard, it is possible for the transmitting node 20 to send data frames 330 immediately upon its backoff time counter reaching zero (i.e. at T1).

The requested time duration for transmission defined in the RTS and CTS frames defines the length of the granted transmission opportunity TXOP, and can be read by any listening node ("other nodes 22" in FIG. 2) in the radio network.

To do so, each node has in memory a data structure known as the network allocation vector or NAV to store the time duration for which it is known that the medium will be busy. When listening to a control frame (RTS 210 or CTS 220) not addressed to itself, a listening node 22 updates its NAVs (NAV 255 associated with RTS and NAV 250 associated with CTS) with the requested transmission time duration specified in the control frame. The listening node 22 thus keeps in memory the time duration for which the radio medium will remain busy.

Access to the radio medium for the other nodes 22 is consequently deferred 30 by suspending 31 their associated timer and then by later resuming 32 the timer when the NAV has expired.

This prevents the listening nodes 22 from transmitting any data or control frames during that period.

It is possible that the destination node 21 does not receive the RTS frame 210 correctly due to a message/frame collision or to fading. Even if it does receive it, the destination node 21 may not always respond with a CTS 220 because, for example, its NAV is set (i.e. another node has already reserved the medium). In any case, the transmitting node 20 enters into a new backoff procedure.

The RTS/CTS four-way handshaking mechanism is very efficient in terms of system performance, in particular with regard to large frames since it reduces the length of the messages involved in the contention process.

In detail, assuming perfect channel sensing by each communication node, collision may only occur when two (or more) frames are transmitted within the same time slot after a DIFS 28 (DCF inter-frame space) or when their own back-off counter has reached zero nearly at the same time T1). If both transmitting nodes use the RTS/CTS mechanism, this collision can only occur for the RTS frames. Fortunately, such collision is early detected by the transmitting nodes since it is quickly determined that no CTS response is received.

As described above, the original IEEE 802.11 MAC always sends an acknowledgement (ACK) frame 240 after each data frame 230 received.

An optional feature of the IEEE 802.11e standard, called Block ACK (acknowledgment by block), allows two or more data frames 230 to be transmitted before a Block ACK frame is returned to acknowledge the receipt of the data frames. The Block ACK increases the efficiency since every ACK frame originally used has a significant overhead for radio synchronization.

Block ACK is initiated through a setup and negotiation process between the transmitting node and the receiving node.

Once the Block ACK has been negotiated and established, multiple data frames can be transmitted in a contention free burst (or during the TXOP), with SIFS separation between the successive data frames. The Block ACK frame returned to the transmitting node includes an acknowledgment bitmap, each information item (e.g. a bit) of which acknowledging the receipt of one of the data frames.

Block ACK has become mandatory in the High Throughput WLAN standard or IEEE 802.11n as introduced above, which provides aggregation of data frames. Indeed, since MSDUs belonging to the same traffic stream (i.e. having the same traffic identifier TID) are aggregated into an A-MSDU and/or into an A-MPDU, an acknowledgment can only apply to a plurality (i.e. a block) of data frames MSDUs.

MSDU and MPDU are quite similar in their relationship with the aggregate A-MPDU, because MSDU and MPDU only differ by encapsulation data. For the description below, MSDU and MPDU are both considered as data frames.

Another aspect that the IEEE 802.11e standard has improved regards the quality of service (QoS), for example latency of data traffic. In the original standard, a communication node includes only one transmission queue/buffer of FIFO type (TX FIFO). However, since a subsequent data frame cannot be transmitted until the transmission/retransmission of a preceding frame ends, the delay in transmitting/retransmitting the preceding frame prevents the communication from having QoS.

The IEEE 802.11e has overturned this deficiency in providing quality of service (QoS) enhancements to make more efficient use of the wireless medium.

This standard relies on a coordination function, called hybrid coordination function (HCF), which has two modes of operation: enhanced distributed channel access (EDCA) and HCF controlled channel access (HCCA).

As can be appreciated by one skilled in the art, EDCA is a contention-based channel access function that operates concurrently with HCCA based on a polling mechanism, which is controlled by a hybrid coordinator (HC) co-located with a QoS Access Point (QAP).

EDCA enhances or extends functionality of the original access DCF method: EDCA has been designed for support of prioritized traffic similar to DiffServ (Differentiated Services), which is a protocol for specifying and controlling network traffic by class so that certain types of traffic get precedence.

EDCA is the dominant channel access mechanism in WLANs because it features a distributed and easily deployed mechanism.

The above deficiency of failing to have satisfactory QoS due to delay in frame retransmission can be solved with a plurality of transmission queues/buffers.

QoS support in EDCA is achieved with the introduction of four Access Categories (ACs), and thereby of four corresponding transmission queues or buffers.

Each AC has its own transmission queue/buffer to store corresponding data frames to be transmitted on the network. The data frames, namely the MSDUs, from an upper layer of the protocol stack are mapped onto one of the four AC queues/buffers and thus input in the mapped AC buffer.

Each AC has also its own set of channel access parameters, and is associated with a priority value, thus defining traffic of higher or lower priority of MSDUs.

That means that each AC (and corresponding buffer) acts as an independent DCF contending entity. In other words, the ACs within the same communication node compete one with each other to access the wireless medium and to obtain a transmission opportunity, using the contention mechanism as explained above with reference to FIG. 2 for example.

Service differentiation between the ACs is achieved by setting different contention window parameters (CWmin, CWmax), arbitrary interframe spaces (AIFS), and transmission opportunity duration limits (TXOP Limit).

With EDCA, high priority traffic has a higher chance of being sent than low priority traffic: a node with high priority traffic waits a little less (low CW) before it sends its packet, on average, than a node with low priority traffic.

The four AC buffers are shown in FIG. 3*a*.

Buffers AC3 and AC2 are usually reserved for real-time applications (e.g., voice or video transmission). They have the highest priorities, respectively the highest priority and the last-but-one highest priority.

Buffers AC1 and AC0 are reserved for best effort and background traffic. They have the lowest priorities, respectively the last-but-one lowest priority and the lowest priority.

Each data frame, MSDU, arriving at the MAC layer from an upper layer (e.g. LLC layer) with a priority is mapped into an AC according to mapping rules. FIG. 3*b* shows an example of mapping between eight priorities of traffic class (User Priorities or UP, 0-7 according IEEE 802.1d) and the four ACs. The data frame is then stored in the buffer corresponding to the mapped AC.

When the backoff procedure of an AC ends, the MAC controller (reference 704 in FIG. 7 below) of the transmitting node transmits a data frame from this AC to the physical layer for transmission onto the communication network.

Since the ACs operate concurrently in accessing the wireless medium, it may happen that two ACs of the same communication node have their backoff ending simultaneously. In such a situation, a virtual collision handler of the MAC controller operates a selection of the AC having the highest priority between the conflicting ACs, and gives up transmission of data frames from the ACs having lower priorities.

Then, the virtual collision handler commands those ACs having lower priorities to start again a backoff operation using an increased CW value.

FIG. 3*c* illustrates configurations of a header of a MAC data frame and a QoS control field (300) included in the header of the IEEE 802.11e MAC frame.

The relevant field of the MAC header is the QoS control field 300.

As represented in the Figure, the QoS control field 300 is made of two bytes, including the following information items:

Bits B0 to B3 are used to store a traffic identifier (TID) which identifies a traffic stream. The traffic identifier takes the value of the transmission priority value (User Priority UP, value between 0 and 7—see FIG. 3b) corresponding to the data conveyed by the data frame or takes the value of a traffic stream identifier (TSID, value between 8 and 15) for other data streams.

Bits B5 and B6 define the ack policy subfield which specifies the acknowledgement policy associated with the data frame. This subfield is used to determine how the data frame has to be acknowledged by the receiving node. Usually, it may take three different values as follows:

value equal to "Normal ACK" in the case where the transmitting node requires a conventional acknowledgment to be sent (by the receiving node) after a short interframe space (SIFS) period following the transmission of the data frame;

value equal to "No ACK" in the case where the transmitting node does not require acknowledgment. That means that the receiving node takes no action upon receipt of the data frame; and value equal to "Block ACK" as defined above. The receiving node takes no action immediately upon receiving the data frame, except the action of recording the state of reception, in its reception scoreboard context. With such a value, the transmitting node is expected to send a Block ACK request (BAR) frame, to which the receiving node responds using the procedure described below.

The other bits B4 and B7-B15 are of less importance for the present invention.

FIG. 4 illustrates the Block ACK mechanism in case of use of A-MPDU according to IEEE 802.11n with EDCA-based QoS according to IEEE 802.11e.

The latter standard defines two Block ACK mechanisms: immediate and delayed block acknowledgment.

When using immediate Block ACK, the transmitting node transmits multiple data frames in a contention free burst, separated by SIFS. This is for example the case of an A-MPDU 450 as shown in FIG. 4a. The transmitting node has to satisfy the constraints of the transmission opportunity (TXOP) duration it is currently operating within, meaning that the number of MPDUs in the A-MPDU is limited.

At the end of the burst, the transmitting node transmits a Block ACK request (BAR) frame 410 to request the receiving node to acknowledge receipt of the received frames. The receiving node must immediately reply with a Block ACK (BA) frame 420 containing the acknowledgement status for each data frame of the previous burst of data frames.

The delayed policy allows the block acknowledgement to be sent in a subsequent TXOP following the burst. The same sequence of a contention free burst and BAR frame is used as in the immediate mode. The receiving node simply sends a standard ACK frame in response to the BAR frame, indicating that the Block ACK is taken into account but delayed.

Delayed acknowledgement increases the latency, and is provided to support lower performance implementations that are unable to immediately calculate the ACK.

The present invention may be implemented with either the immediate Block ACK or the delayed Block ACK.

FIG. 4b illustrates a conventional BAR frame 410.

The BAR frame 410 is made up of the following fields: a frame control field, a duration field, a RA (Receiver Address) field, a TA (Transmitter Address) field, a Block ACK control field 411 (two-byte long), a Block ACK Info field 412 and a CRC/FCS (Cyclic Redundancy Check, or Frame Check Sequence, or also called checksum) field.

Block ACK control field 411 includes the traffic identifier TID (traffic stream) corresponding to the data frames to be acknowledged.

Block ACK Information field 412 is (in the IEEE 802.11e standard) or includes (802.11n standard) a "Block ACK starting sequence control" value (BA-SSC), which is the sequence number (SSN) of the oldest MPDU in the frame burst (i.e. A-MPDU) for which an acknowledgement is needed. Conventionally, this is the sequence number identifying the first MPDU of the A-MPDU. Note that the sequence number is incremented by one for each new data frame transmitted.

The other fields are of less importance for the present invention.

FIG. 4c illustrates a conventional BA frame 420.

The BA frame 420 is made up of the following fields: a frame control field, a duration field, a RA (Receiver Address) field, a TA (Transmitter Address) field, a Block ACK control field 411 identical to the one in the corresponding BAR frame 410, a Block ACK starting sequence control field 421 (BA-SSC) containing a starting sequence number (SSN), a Block ACK bitmap field 422, and a CRC (checksum) field.

The starting sequence number SSN of two-byte BA-SSC 421 is the sequence number of the first MPDU in the frame burst (i.e. A-MPDU) for which BA frame 420 is sent. It is usually of the same value as the BA-SSC value in field 412 of corresponding received BAR frame 410.

The BA bitmap field indicates the receipt status of up to 64 consecutive MPDUs. The size can be either 128 bytes (originally in 802.11e, the uncompressed bitmap is composed of 16-bits word representing one MSDU, possibly fragmented and wherein 1 bit represents a MSDU fragment) or 8 bytes in its compressed form (from 802.11n version, one bit representing one MPDU encapsulating one MSDU or A-MSDU). For example, each bit of the BA bitmap is used to define the acknowledgment status of each successive data frame MPDU starting from the data frame identified in BA-SSC: a zero (0) in the bitmap indicates that the corresponding MPDU has not been received and a one (1) indicates that it has been correctly received.

The other fields are of less importance for the present invention.

Back to FIG. 4a, in an exemplary communication sequence, an A-MPDU 450 is transmitted from the transmitting node to the receiving node, over a wireless channel. The transmitting node transmits multiple data MPDUs 230 in A-MPDU 450 followed by a BAR frame 410. On receipt of the A-MPDU 450 and the BAR 410, the receiving node generates a BA frame 420 in response and transmits it to the transmitting node over the wireless channel. BA frame 420 indicates the receipt status of each MPDU 230 in the received A-MPDU 450.

Since the BA bitmap is only defined in relation to BA-SSC, an acknowledgment status is provided for any following data frame MPDU of the frame burst, regardless of whether such data frames require acknowledgment or not. In other words, Block ACK is session-oriented so that independent acknowledgment policies cannot be applied to individual data frames belonging to the same traffic stream.

Some traffic streams (identified by a traffic identifier TID) include data frames requiring acknowledgment and other data frames requiring no acknowledgment. This is for example the case of video traffic where a video stream has acknowledgment to ensure high level of reliability and where an associated control data stream faces less reliability and thus can be transmitted without acknowledgment.

Figure 5:
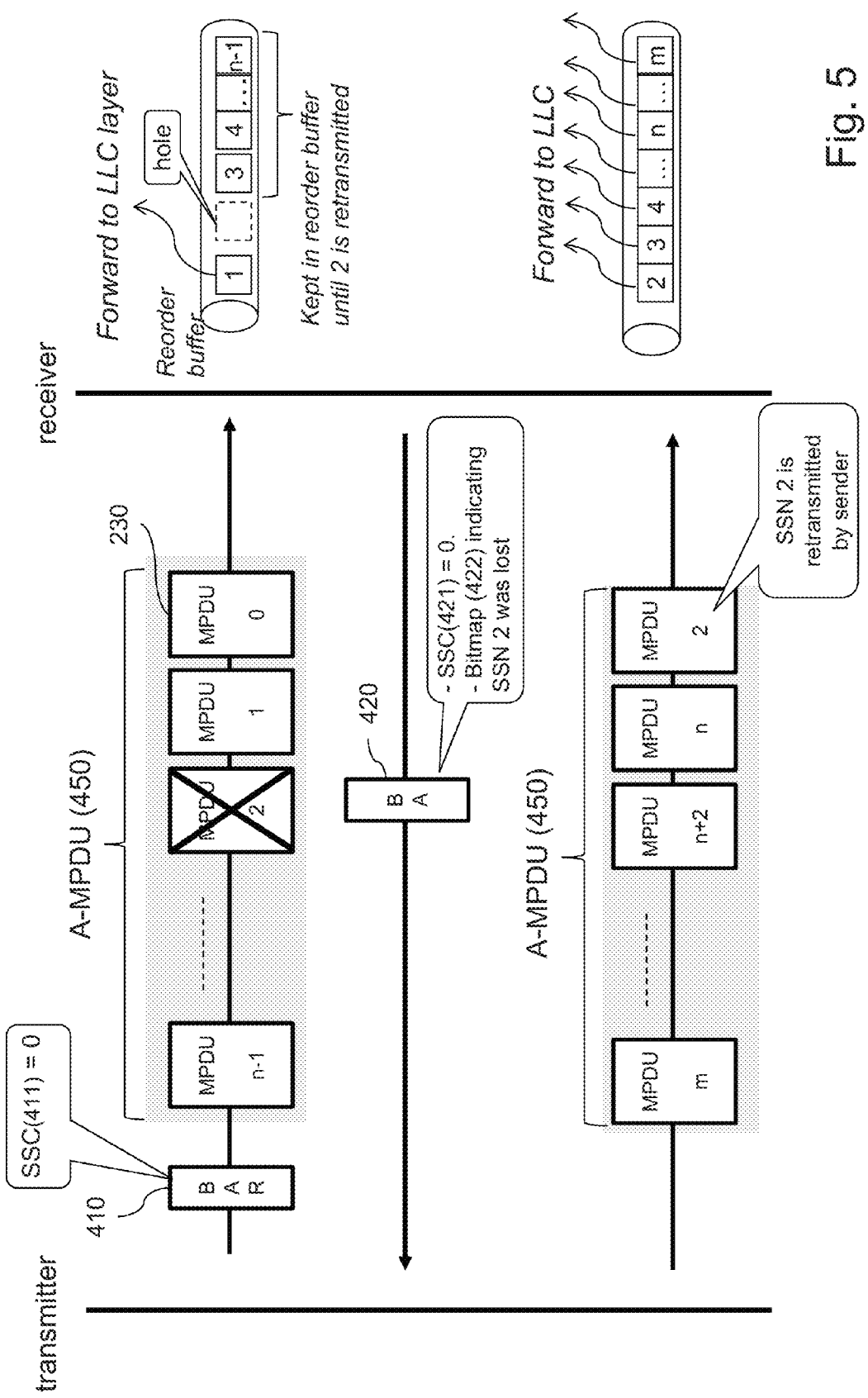
FIG. 5 is a timeline of communication of known systems illustrating the head-of-line blocking problem.

FIG. 5 illustrates an impact of session-oriented Block ACK on the processing of the data frames at the receiving node.

As the receiving node receives the data frames of the aggregated frame A-MPDU, it updates the BA bitmap 422 starting from the data frame having the sequence number identified in BA-SSC of field 412 in BAR frame 410.

In parallel, the receiving node maintains a reorder FIFO buffer (shown on the right hand of the Figure) per each couple TA/TID, to ensure that MSDU packets (desencapsulated from MPDU frames 230) are forwarded to the upper stack layer (e.g. LLC layer) in the appropriate order.

When a MPDU frame requires retransmission, the receiving node adds all subsequently transmitted data frames into the reorder buffer until the missing data frame has been successfully recovered or has been given up on.

For example, in the Figure, let us assume that MPDU frame 2 is received in error within the first frame burst (A-MPDU) 450.

Even though subsequent data frame 3 is correctly received at the receiver, this data frame cannot be delivered to the upper layer of the recipient MAC (as example, typically the LLC layer, for Logical Link Control of the OSI protocol stack), since data frame 2 must be delivered to the upper layer first according to the in-order delivery constraint of the IEEE 802.11 standard.

That is, the delivery of data frames 3-to-n is delayed until data frame 2 is correctly received in a subsequent A-MPDU.

This blocking of data frames due to the absence of one first data frame in the reorder buffer is called Head-of-Line Blocking problem in FIFO queues. Head of Line blocking is known as reducing the efficiency of MAC protocol in term of latency delivery.

In response to BAR request 410 that follows the first A-MPDU 450 and that queries the acknowledgment status of the n (or less) transmitted MPDU frames, the BA frame 420 doesn't acknowledge good reception of data frame 2.

As a response, the transmitting node will send the missing data frame 2 in the next A-MPDU as shown in the Figure.

But since it may happen that the missing data frame 2 does not intrinsically need acknowledgment, this retransmission is useless and thus reduces the efficiency of MAC protocol in term of bandwidth usage.

The above-described mechanisms exist in the communication system of FIG. 1 where several nodes 101-107 exchange data packets through a transmission channel 100 that may drop or corrupt the data packets.

All data exchanges between the nodes of the communication system are managed through the standardized 802.11n MAC/PHY layers.

The nodes of the communication system may deal with video category: video receivers aiming at receiving both video streams and related commands, video source aiming at acquiring video data and streaming to local receivers. Some of the nodes may have also an advanced GUI allowing a user to configure source and receivers before/while the video streaming occurs (e.g. content discovery services, play commands, etc.).

In addition, there may have concurrent accesses e.g. for printing with a printer forming node of the network, which may altogether create perturbations over the wireless channel.

Any communication node of FIG. 1 can act as a transmitting node according to the invention as now described with reference to FIGS. 6 to 10, to reduce the Head-of-Line Blocking phenomenon defined above when erroneously received data frames would not require acknowledgment.

Such a transmitting node performs the following steps:

obtaining a plurality of frames, e.g. MSDUs or MPDUs, including at least one first-type frame associated with an acknowledgment policy requiring acknowledgment, e.g. video stream, and at least one second-type frame associated with an acknowledgment policy requiring no acknowledgment, e.g. associated control stream;

aggregating the frames of the obtained plurality of frames into an aggregated frame, e.g. A-MPDU, including at least one leading frame of second type and frames subsequent thereto, in an order depending on their associated acknowledgment policies;

sending the aggregated frame to a receiving node;

sending an acknowledgment request frame, BAR frame, to the receiving node to request it to acknowledge receipt of only subsequent frames of the aggregated frame.

Thanks to the reordering of the data frames in the aggregated frame (compared to their order in the transmission queue or buffer from where they are obtained), the number of second-type frames (originally requiring no acknowledgment) preceding the first first-type frame in the A-MPDU can be increased.

Furthermore, thanks to the acknowledgment request frame that is designed to request acknowledgment for a subset of frames by shifting the first frame to be requested in the aggregated frame to a first first-type frame for example, the head-of-line blocking is reduced, and therefore the latency. This is because the increased number of second-type frames preceding this first first-type frame reduces cases when the head-of-line blocking phenomenon happens.

Also, the number of useless retransmissions of second-type frames is decreased thereby reducing bandwidth waste, since less second-type frames are retransmitted.

FIG. 6 schematically illustrates a communication device 600 of the radio network 100, configured to implement at least one embodiment of the present invention. The communication device 600 may be a device such as a microcomputer, a workstation or a light portable device. The communication device 600 comprises a communication bus 613 to which there are preferably connected:

a central processing unit 611, such as a microprocessor, denoted CPU;

a read only memory 607, denoted ROM, for storing computer programs for implementing the invention;

a random access memory 612, denoted RAM, for storing the executable code of methods according to embodiments of the invention as well as the registers adapted to record variables and parameters necessary for implementing methods according to embodiments of the invention; and at least one communication interface 602 connected to the radio communication network 100 over which digital data packets or frames are transmitted, for example a wireless communication network according to the 802.11n protocol. The data frames and aggregated frames are written from a FIFO sending memory in RAM 612 to the network interface for transmission or are read from the network interface for reception and writing into a FIFO receiving memory in RAM 612 under the control of a software application running in the CPU 611.

Optionally, the communication device 600 may also include the following components:

a data storage means 604 such as a hard disk, for storing computer programs for implementing methods according to one or more embodiments of the invention;

a disk drive 605 for a disk 606, the disk drive being adapted to read data from the disk 606 or to write data onto said disk;

a screen 609 for displaying decoded data and/or serving as a graphical interface with the user, by means of a keyboard 610 or any other pointing means.

The communication device 600 can be connected to various peripherals, such as for example a digital camera 608, each being connected to an input/output card (not shown) so as to supply data to the communication device 600.

The communication bus provides communication and interoperability between the various elements included in the communication device 600 or connected to it. The representation of the bus is not limiting and in particular the central processing unit is operable to communicate instructions to any element of the communication device 600 directly or by means of another element of the communication device 600.

The disk 606 can be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may be stored either in read only memory 607, on the hard disk 604 or on a removable digital medium such as for example a disk 606 as described previously. According to a variant, the executable code of the programs can be received by means of the communication network 603, via the interface 602, in order to be stored in one of the storage means of the communication device 600, such as the hard disk 604, before being executed.

The central processing unit 611 is adapted to control and direct the execution of the instructions or portions of software code of the program or programs according to the invention, which instructions are stored in one of the aforementioned storage means. On powering up, the program or programs that are stored in a non-volatile memory, for example on the hard disk 604 or in the read only memory 607, are transferred into the random access memory 612, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

FIG. 7 is a block diagram schematically illustrating the architecture of a node 600 adapted to carry out, at least partially, the invention. As illustrated, node 600 comprises a physical (PHY) layer block 703, a MAC layer block 702, and an application layer block 701.

The PHY layer block 703 (here a 802.11 standardized PHY layer) has the task of formatting and sending or receiving frames over the radio medium used 100, such as a medium access request of the RTS type to reserve a transmission slot, a medium access response of the CTS type to acknowledge reservation of a transmission slot, as well as of data frames and aggregated frames to/from that radio medium.

The MAC layer block or controller 702 comprises a standard MAC 802.11 layer 704 and four additional blocks 705 to 708 for carrying out, at least partially, the invention. The MAC layer block 702 may be implemented in software, which software is loaded into RAM 612 and executed by CPU 611.

According to a particular embodiment, the node data transmission block 705 performs the task of exchanging data packets with the PHY layer 703 and the application layer 701.

The RTS/CTS module 706 has the task of managing Request-To-Send (RTS) and Clear-To-Send (CTS) frames.

The Incoming Traffic queuing and ACK module 707 is configured to implement part of the invention, in particular to determine, at MAC level, the acknowledgment policy of each incoming data frame; to group the incoming data frames for which no acknowledgment is required and to group the other data frames for which an acknowledgment is required; to obtain the sequence number of the first of these other data frames.

The backoff management block 708 has the task of managing the backoff value used by the node in a collision avoidance scheme.

Finally, the application layer block 701 implements an application that generates and receives data packets, for example data packets of a video stream.

Figure 8:
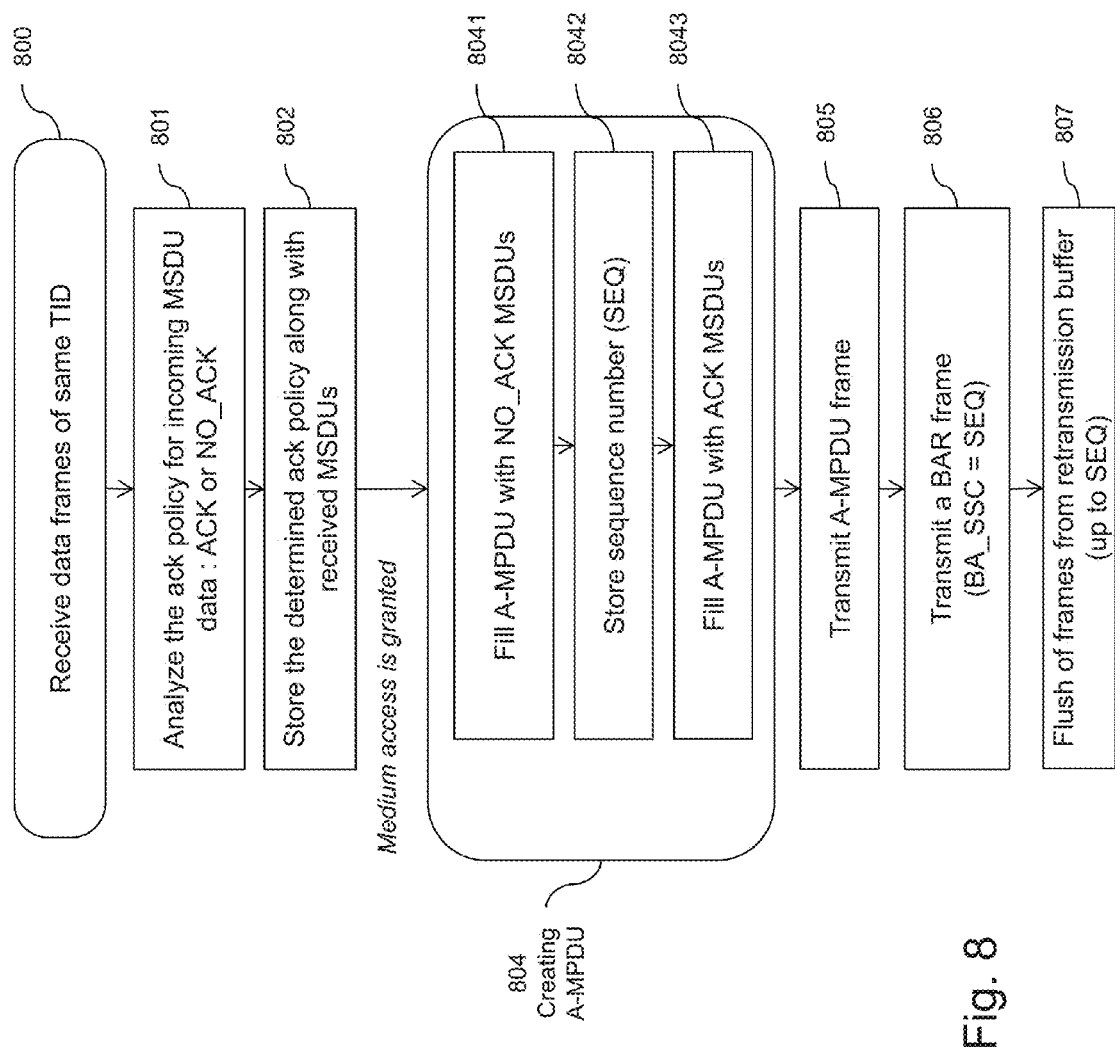
FIG. 8 is a flowchart illustrating general steps of building an aggregated frame according to the invention.
Figure 9:
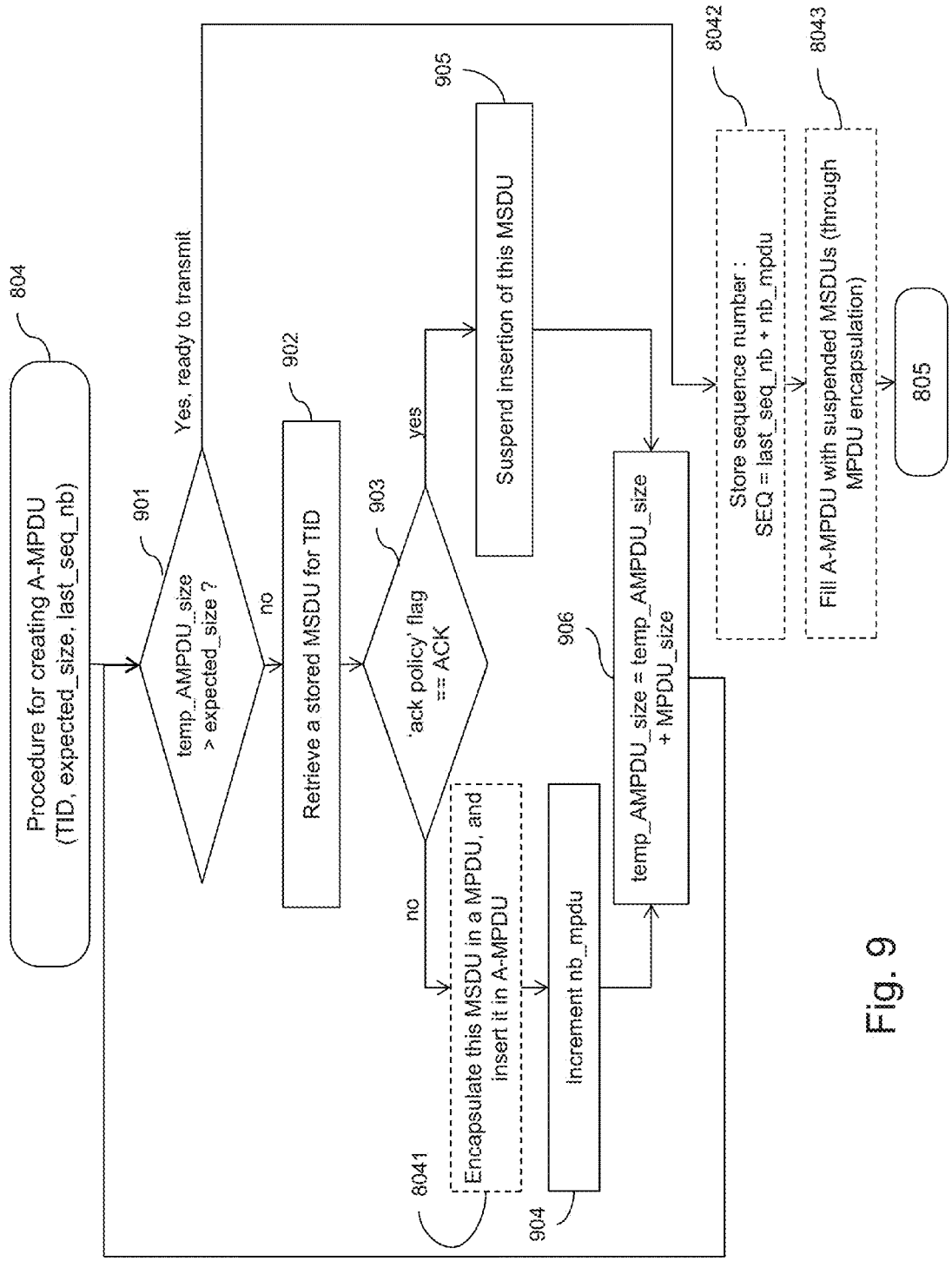
FIG. 9 is a flowchart illustrating exemplary steps of creating an A-MPDU in the process of FIG. 8, according to a particular implementation.
Figure 10:
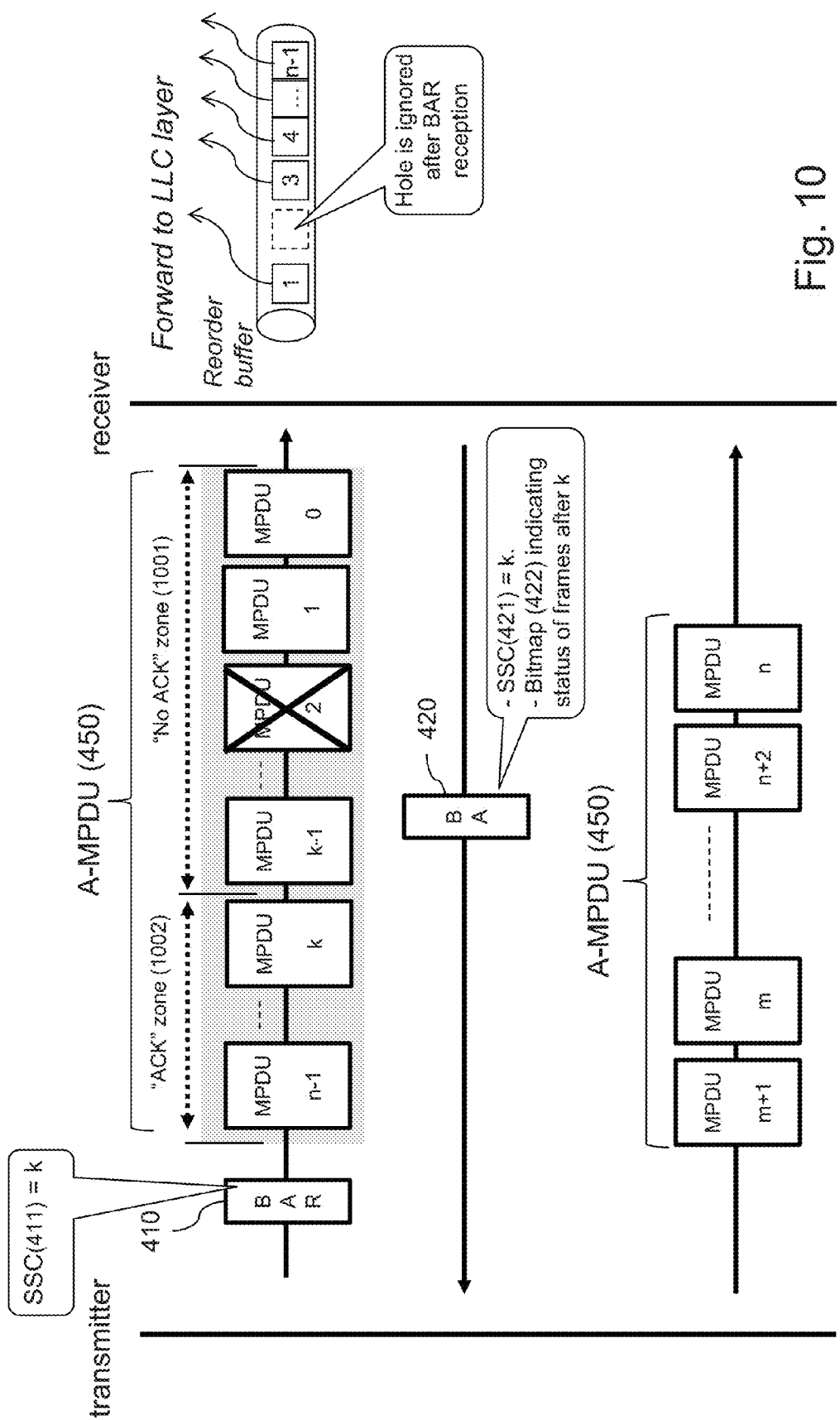
FIG. 10 is a timeline of communication of nodes according to the invention.

FIGS. 8 to 10 illustrate an exemplary implementation of the invention.

FIG. 8 is a flowchart illustrating general step of an embodiment of the invention at any wireless communication node having to communicate with one or more receiving node: the transmitting node can be a base station, or one or more wireless stations such as 101 to 107 of FIG. 1. The transmitting node sends MSDU packets of several application flows pertaining to a same traffic category (TID) using aggregate MPDUs.

In this example, MPDU frames not requiring acknowledgment appears in first positions in the aggregated frame A-MPDU, followed by MPDU frames requiring acknowledgment. This makes it possible to keep a BAR frame including a BA-SSC identifying the sequence number of the first MPDU frame requiring acknowledgment. The preceding MPDUs not requiring acknowledgment are therefore not concerned by the session-oriented acknowledgment defined by the BAR frame. As a consequence, the receiving station can transparently determine the position, in A-MPDU, of the frames actually requiring acknowledgments and acknowledge each frame according to its respective acknowledgment policy.

The process starts at step 800 with the reception, by the MAC layer of the node, of data frames relating to the same type of traffic (i.e. same TID) from an upper layer.

When such a data frame is received, step 801 provides analyzing the acknowledgment policy of that data frame, to determine whether an acknowledgment is required (the data frame is thus of the first type) or no acknowledgment is required (the data frame is thus of the second type).

Also at step 802, a frame handler in module 707 extracts user priority (UP) information from 'Type Of Service' Byte in the IP Header (IP, for Internet Protocol, RFC-791).

A traffic ID (TID) can be determined using the table of FIG. 3*b*, which TID is then included in the QoS control field 300 of FIG. 3*c* when building a MPDU frame header for incoming data.

Function of the determined TID, the frame handler maps the incoming data (MSDU) in one of the four AC queues or buffers (TX FIFO): AC[0]-AC[3]. For example, for video category, queue AC[2] is used to manage all data frames having TID 4 and 5 (according IEEE 802.11d).

Back to step 801, the transmitting node according to the invention needs to determine the acknowledgment policy of any incoming data frame, so that such policy can be associated with the incoming frames.

Typically, the criteria for determining acknowledgment policy may be based on transport protocol (TCP, UDP), traffic specification at MAC management level (latency criteria, indicating no possibility to retransmit a real-time traffic).

For sake of illustration, one may consider having configuration tools (for example a user interface on the IEEE 802.11 device) to set this acknowledgment policy (ack/no ack) for streaming traffic on top of UDP and TCP protocols.

In embodiments, means are providing to detect the used transport protocol only for the streaming contents, in order to limit application of the invention to streaming protocols.

Some examples allowing demonstrating how to capture the transport protocols of traffic over wireless are discussed below.

Nowadays, there is an increased industry interest in direct discovery between nodes to provide proximity-based services such as peer to peer (P2P) communication between nodes. As an example, Wi-Fi Alliance (WFA) is evaluating enhancements needed to enable proximity-based services and service discovery. Recently, a Wi-Fi display (WFD) standard has been newly defined based on a requirement to transmit audio/video (AV) data while satisfying high quality and low latency. The WFD standard considers AV data transmission and control via a user input in a transmitting node.

Typical connection cycle for such P2P communication is the following.

(1) First, a device and service discovery of proximal nodes is conducted. It may be implemented through a scan for device and service advertising messages from proximal nodes.

(2) Then, an authentication is conducted.

(3) Finally, an association with a discovered node is made, and then an application level session is setup.

A receiving node may be aware of the specifications of upcoming data streaming either or both at pre-association P2P step (1) or session setup step (3).

As exemplary according WFD standard, first, L2 (OSI Layer 2) device and service discovery is performed between a transmitting node and a receiving node supporting a WFD. Hereafter, an L2 secure setup is performed, and then followed by a L3 (OSI Layer 3) WFD discovery, in which detailed device information and service information is exchanged.

Then, an L3 AV session is established: an RTSP (real-time streaming protocol) is used for an AV control session, an RTP is used for an AV data session, and a high-bandwidth digital content protection (HDCP) 2.0 is used for content protection. AV data is converted into a data unit transportable according to MPEG2 TS or H.264, and is transmitted from the transmitting node to the receiving node via the RTP. As the transmitting node of the invention pertains to the L3 AV session, it is fully aware of the AV stream specifications and protocols/port numbers used. The transmitting node is thus able to determine the acknowledgment policy corresponding to each received stream.

The RTSP, the RTP, and the RTCP are well known to one of ordinary skill in the art.

Other examples of protocols allowing stream specification discovery exist, including the following ones:

Wi-Fi protected setup (WPS) protocol offering discovery of services, audio/video profile prior to Layer 2 connection;

Layer 3 discovery protocols, such as UPnP, Bonjour;

Session Description File (SDF) of a session description protocol (SDP, RFC2327), which can have been downloaded by $Nc_i$ recipient though HTTP or RTSP protocols at the session start or prior to the session start in case it can be announced via a session announcement protocol (SAP).

As a result, step 801 is able to determine the acknowledgment policy using the transport protocol used (TCP, UDP), and possibly supplemented with the port number detected (stream precise detection according to previous examples).

Once the acknowledgment policy has been determined for any incoming data frame, step 802 provides that the incoming data frame is stored in the appropriate AC TX FIFO queue together with a flag ('ack policy' flag specifically managed inside the AC FIFO queues; not to be mistaken with ack policy flag of QoS Control Field 300 of a MPDU frame which is always kept as Block ack value when using AMPDU aggregation) defining the associated required acknowledgment policy. This costs little memory while making it easy for the MAC layer to have this information. For example the flag may take the value zero (0) in case of acknowledgment required and take the value one (1) in case no acknowledgment of the data frame is required.

Later on, upon successful contention for one of the four ACs, the transmitting node is granted access to the IEEE 802.11 channel to transmit data frames stored in the AC transmission buffer. Step 804 is thus performed.

Step 804 mainly comprises three actions, an embodiment of which is shown in FIG. 9.

A first action 8041 is to aggregate the WLAN MAC frames (MSDU data) for which no acknowledgement is required and to be transmitted in the A-MPDU, i.e. with 'ack policy' flag in TX FIFO queue set to 'No ACK' (or the value one (1)).

A second action 8042 consists to retrieve the starting sequence number SSN defining the frame transmission (sequence number or BA-SSC in field 412) of the MPDU which will follow those data frames without acknowledgment. As explained above, this sequence number identifies the first data frame with acknowledgment.

A third action 8043 is to complete the aggregation of the data frames to be transmitted during the TXPO by aggregating the WLAN MAC frames for MSDU data for which an acknowledgement is required, i.e. with 'ack policy' flag in TX FIFO queue set to 'ACK' (or the value zero (0)).

These three actions are shown as sequentially performed in FIG. 8.

In the implementation of FIG. 9, they are performed in parallel.

Although both A-MSDU and A-MPDU exist, the following description makes only reference to A-MPDU. A-MSDU aggregation protocol is not considered in this example as its application is located on top of the MAC stack, contrary to A-MPDU encapsulation which runs at bottom of the 802.11 MAC stack. Therefore, the A-MSDU scheme is fully compatible with the present invention: it is apparent to one skilled in the art that the MSDUs respectively selected for steps 8041 and 8043 can be encapsulated into a respective A-MSDU, which is thus considered as an MPDU to fill in the A-MPDU under construction.

The example of FIG. 9 may occur once a backoff operation has ended for an AC of the transmitting node. This may follow a transmission request generated within the transmitting node. And, if the wireless medium is idle for a longer time than the AIFS[AC] time, the MAC controller 704 of the node may continuously determine whether a backoff operation has ended for the ACs, until one of the backoff operations for the ACs ends.

More generally, step 804 is also triggered when the medium access is granted to the transmitting node.

As an alternative of expiry of a backoff counter, a polling request for an access point or a reverse direction granting according IEEE802.11 Reverse Direction Protocol may be considered as triggering events.

The MAC Layer block 704 is aware of the considered traffic (TID), the allowed talk duration ("expected_size" on the Figure, representing the amount of data to exchange: expected_size=802_11_Phy_rate×duration), and of course the last sequence number (last_seq_nb) used during previous transmissions (as an example, this may be a single counter modulo-4096, starting at 0 and incrementing by 1 for each MSDU).

Note that, as per the IEEE specification, two TIDs may be mapped onto a single access category (AC), but they are treated (similarly) as two separate streams. This leads the MAC layer to virtually split the AC buffer into two (or more if the buffer hosts more than two TIDs) with the same medium access parameters, so that MSDU frames are aggregated separately within the AC buffer based on the TID.

In this context, the implementation of FIG. 9 only deals with one single TID. Similar process is thus performed for any additional virtually-split AC buffer based on another TID.

The process of FIG. 9 comprises test 901 to determine if the sum (temp_MPDU_size) of the sizes of the data frames retrieved from the AC TX FIFO buffer (for the TID considered and the current A-MPDU) exceed the "expected_size" or not. Note that it is quite equivalent to consider the size of the MSDU or the size of the MPDU, the difference relying on MPDU headers.

If the threshold "expected_size" has not been reached, another MSDU is retrieved from the AC buffer for the TID considered, at step 902.

In other words, until the expected duration is not reached (temporary size of under-building A-MPDU has not reached the maximum size), a new MSDU is retrieved with a view of aggregating it with the previous one.

Note that the "expected_size" is thus a criteria to determine end of creation of the aggregated frame A-MPDU.

For each current MSDU in the AC buffer, which also matches the TID considered, an analysis of the 'ack_policy' is conducted at step 903 based on the flag stored in the AC buffer together with the current MSDU.

In the case where the 'ack_policy' requires no acknowledgment, the retrieved current MSDU is encapsulated in a MPDU for transportation and the resulting MPDU is directly inserted in the A-MPDU under construction, following the previously inserted MPDUs. In other words, it is enqueued in the A-MPDU under construction. This is action 8041.

It is followed by step 904 where a counter storing the number of added MPDUs is incremented by one (starting from 0 at the beginning of the process of the Figure). This counter is useful in the process of obtaining the sequence number of the first MPDU inside the A-MPDU which corresponds to a MSDU requiring acknowledgment as described below at action 8042.

In the case where the 'ack_policy' requires acknowledgment, the retrieved current MSDU is temporary kept away from insertion in the A-MPDU. This is step 905, where the retrieved current MSDU is stored in a separate memory that keeps the same order of the MSDUs with acknowledgment as in the AC TX FIFO buffer.

Next to step 904 or 905, step 906 consists to increment the current variable 'temp_AMPDU_size' by the size of the current MPDU (or MSDU if appropriate). This step is useful to keep A-MPDU size under the limit of test 901.

Once the threshold "expected_size" has been reached, the retrieved MSDUs use all the available duration. In such situation, action 8042 is performed to determine and store the sequence number SEQ (BA-SSC for field 412) of the first MPDU to be acknowledged. This sequence number is directly retrieved from 'last_seq_nb' and the number of added MPDUs (in the counter of step 904), by summing these two values. SEQ identifies the first frame of A-MPDU that requires acknowledgment, i.e. the first first-type frame.

Next to action 8042, action 8043 provides encapsulation of the MSDUs stored in the separate memory (of step 905) into MPDUs, and addition of the resulting MPDUs (keeping their order) into A-MPDU. More precisely, the MPDUs are enqueued in the A-MPDU keeping their order as in the separate memory.

Back to FIG. 8, step 804 is followed by step 805 where the built A-MPDU is transmitted over the wireless network to the receiving node.

Next, step 806 provides transmitting the Block ACK Request frame 410 wherein the 'Starting Sequence Control' value in field 412 is set to the determined SEQ value (action 8042).

This step of sending BAR frame triggers a flush (step 807) of the transmitted MPDUs from the retransmission buffer of the transmitting node, up to the MPDU having the SEQ sequence number.

Note that this approach is quite different from conventional IEEE 802.11 behavior, wherein a flush needs to be performed by the transmitting node upon detection of timeout data in the transmitting node's transmission FIFO, and a BAR is issued to inform the receiving node of the flush.

Here, the flush is driven in the transmitting node to data requiring no acknowledgment.

FIG. 10 illustrates, in the same fashion as FIG. 5, the effect of the invention on the head-of-line blocking phenomenon.

Considering the same frame transmission as in FIG. 5, a number n of MPDU frames for a given TID and a given AC buffer is transmitted in a first group (first A-MPDU 450), followed by m-n MPDU frames at a second instant (second A-MPDU 450). Again MPDU#2 of the first A-MPDU is received with error.

Using the process of FIG. 8, one can clearly see the ordering of MPDUs inside the A-MPDU 450 is different from FIG. 5.

Instead of having MPDUs with acknowledgment requirement interleaved with MPDUs without acknowledgment requirement, a first group of MPDUs (sequence number from 0 to k−1) are MPDUs conveying traffics which do not require any acknowledgment (MSDUs with associated ack_policy in FIFO queue set to 1), and a second and last group of MPDUs (sequence number from k to n−1) are MPDUs conveying traffics which require an acknowledgment (MSDUs with associated ack_policy in FIFO queue set to 0). Thus two zones are created: a 'No ACK' zone 1001 and an 'ACK' zone 1002.

In order to fulfill the principle of the invention, the BAR frame 410 which follows the A-MPDU 450 requests acknowledgment at MAC level by the receiving node for only zone 1002. This is transparently performed by the transmitting node, by specifying 'k' as BA-SCC (411) to start acknowledgement from MPDUs having sequence number 'k'. This field value (411) informs the receiving node to flush any stored reception scoreboard for delivery status of previous MPDUs (less than k).

As a result, the scheme of the invention avoids wasting time at the receiving node when using the reorder buffer: all the (correctly) received frames are de-encapsulated and sent to the upper layer stack. This also removes the Head-of-line blocking due to missing primer frames (as example for MPDU #2).

In response, the BA frame only acknowledges the reception status of MPDU frames (inside A-MPDU 550) after sequence k (included). The acknowledgment procedure is thus limited to the 'ACK' zone 1002.

As one can note, only one BAR frame 410 is sent after an A-MPDU (all together corresponding to same TID). In case of several A-MPDUs sent, there may have several BAR frames issued if the sent A-MPDUs concern different TIDs.

In another embodiment, there may have a single BAR frame which acknowledges multiple TIDs: this is called a multi-TID block ack scheme, according 802.11n standard. The present invention is also applicable to that multi-TID scheme.

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method for data communication in a communication network, the method comprising, at a transmitting node:
   obtaining a plurality of frames including at least one first-type frame associated with an acknowledgment policy requiring acknowledgment and at least one second-type frame associated with an acknowledgment policy requiring no acknowledgment;
   aggregating the frames of the obtained plurality of frames into an aggregated frame including at least one leading frame of second type and frames subsequent thereto, in an order depending on their associated acknowledgment policies;
   sending the aggregated frame to a receiving node;
   sending an acknowledgment request frame to the receiving node to request it to acknowledge receipt of only subsequent frames of the aggregated frame.

2. The method of claim 1, wherein the second-type frames are all inserted at the beginning of the aggregated frame, before the first-type frames, and the acknowledgment request frame requests the receiving node to acknowledge receipt of only the first-type frames of the aggregated frame.

3. The method of claim 2, wherein aggregating the frames comprises:
   successively retrieving frames from an output of a transmission buffer so long as a sum of the sizes of the retrieved frames does not exceed a predefined threshold, to enqueue each retrieved frame in the aggregating frame if the retrieved frame is associated with an acknowledgment policy requiring no acknowledgment or to store the retrieved frame in a separate ordered memory if the retrieved frame is associated with an acknowledgment policy requiring acknowledgment; and
   enqueuing the frames stored in the separate ordered memory in the aggregating frame keeping their order, once the sum reaches the predefined threshold.

4. The method of claim 1, wherein each frame in the transmission buffer is associated with a flag defining its associated acknowledgment policy, the flag being stored in the transmission buffer.

5. The method of claim 1, wherein the acknowledgment request frame includes a sequence number defining the first subsequent frame to acknowledge in the aggregate frame, said sequence number identifying the first frame of the first type inserted in the aggregated frame.

6. The method of claim 5, further comprising, at the transmitting node:
   storing each frame of the plurality of frames in a retransmission buffer until receiving an acknowledgment of such frame from the receiving node; and
   upon sending the acknowledgment request frame, flushing stored frames from the retransmission buffer up to the frame identified by the sequence number.

7. The method of claim 1, further comprising, at the transmitting node, determining the acknowledgment policy of each frame of the plurality of frames based on protocol information of a protocol of higher OSI layer than the protocol embedding the frame aggregation scheme.

8. The method of claim 1, wherein the frames of the obtained plurality of frames are Medium Access Control (MAC) Service Data Units (MSDUs) and the aggregated frame is an aggregate-MAC Protocol Data Unit (A-MPDU) according to the IEEE 802.11n standard.

9. The method of claim 1, wherein the communication network has a wireless medium shared between a plurality of communication nodes, and the aggregated frame and the acknowledgment request frame are sent upon contention-based accessing the shared wireless medium for a transmission opportunity.

10. The method of claim 1, wherein the plurality of frames is obtained from a transmission buffer selected from a plurality of transmission buffers corresponding to a plurality of access categories having different network access parameters and different transmission priority values.

11. The method of claim 10, wherein the transmission buffers compete for accessing a wireless medium of the communication network using a contention-based mechanism.

12. The method of claim 11, wherein each of the transmission buffers implements a backoff procedure for it to be granted a transmission opportunity on the communication network, and preference for grant of a transmission opportunity is given to the transmission buffer associated with the highest transmission priority value when the backoff procedures of two or more transmission buffers end simultaneously.

13. A communication device in a communication network, comprising:
   an obtaining module configured to obtain a plurality of frames including at least one first-type frame associated with an acknowledgment policy requiring acknowledgment and at least one second-type frame associated with an acknowledgment policy requiring no acknowledgment;
   a frame aggregator configured to aggregate the frames of the obtained plurality of frames into an aggregated frame including at least one leading frame of second type and frames subsequent thereto, in an order depending on their associated acknowledgment policies;

a network transmission module configured to send the aggregated frame to a receiving node and to send an acknowledgment request frame to the receiving node to request it to acknowledge receipt of only subsequent frames of the aggregated frame.

14. The device of claim 13, wherein the frame aggregator is configured to insert all the second-type frames at the beginning of the aggregated frame, before the first-type frames.

15. The device of claim 14, wherein the frame aggregator is configured to successively retrieve frames from an output of a transmission buffer so long as a sum of the sizes of the retrieved frames does not exceed a predefined threshold, to enqueue each retrieved frame in the aggregating frame if the retrieved frame is associated with an acknowledgment policy requiring no acknowledgment or to store the retrieved frame in a separate ordered memory if the retrieved frame is associated with an acknowledgment policy requiring acknowledgment; and enqueue the frames stored in the separate ordered memory at the end of the aggregating frame keeping their order, once the sum reaches the predefined threshold.

16. The device of claim 13, configured to include, in the acknowledgment request frame, a sequence number defining the first subsequent frame to acknowledge in the aggregate frame, said sequence number identifying the first frame of the first type inserted in the aggregated frame.

17. The device of claim 16, further comprising:

a retransmission buffer to store each frame of the plurality of frames until receiving an acknowledgment of such frame from the receiving node; and flushing means configured to flushing stored frames from the retransmission buffer, up to the frame identified by the sequence number, upon detecting the sending by the device of the acknowledgment request frame.

18. A non-transitory computer-readable medium storing a program which, when executed by a microprocessor or computer system in a communication device of a communication network, causes the communication device to perform the steps of:

obtaining a plurality of frames including at least one first-type frame associated with an acknowledgment policy requiring acknowledgment and at least one second-type frame associated with an acknowledgment policy requiring no acknowledgment;

aggregating the frames of the obtained plurality of frames into an aggregated frame including at least one leading frame of second type and frames subsequent thereto, in an order depending on their associated acknowledgment policies;

sending the aggregated frame to a receiving node;

sending an acknowledgment request frame to the receiving node to request it to acknowledge receipt of only subsequent frames of the aggregated frame.

* * * * *